Patented Jan. 6, 1931

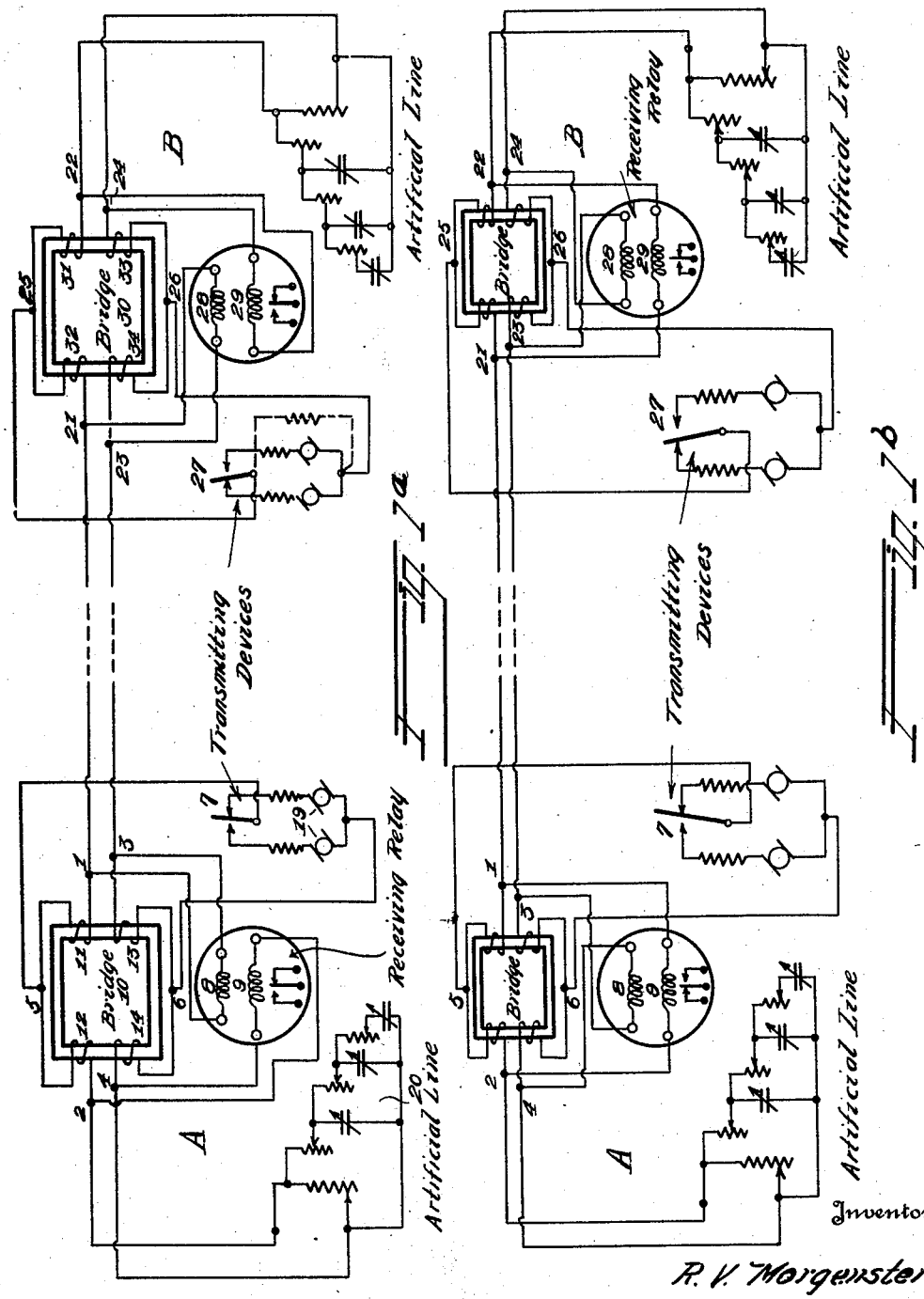

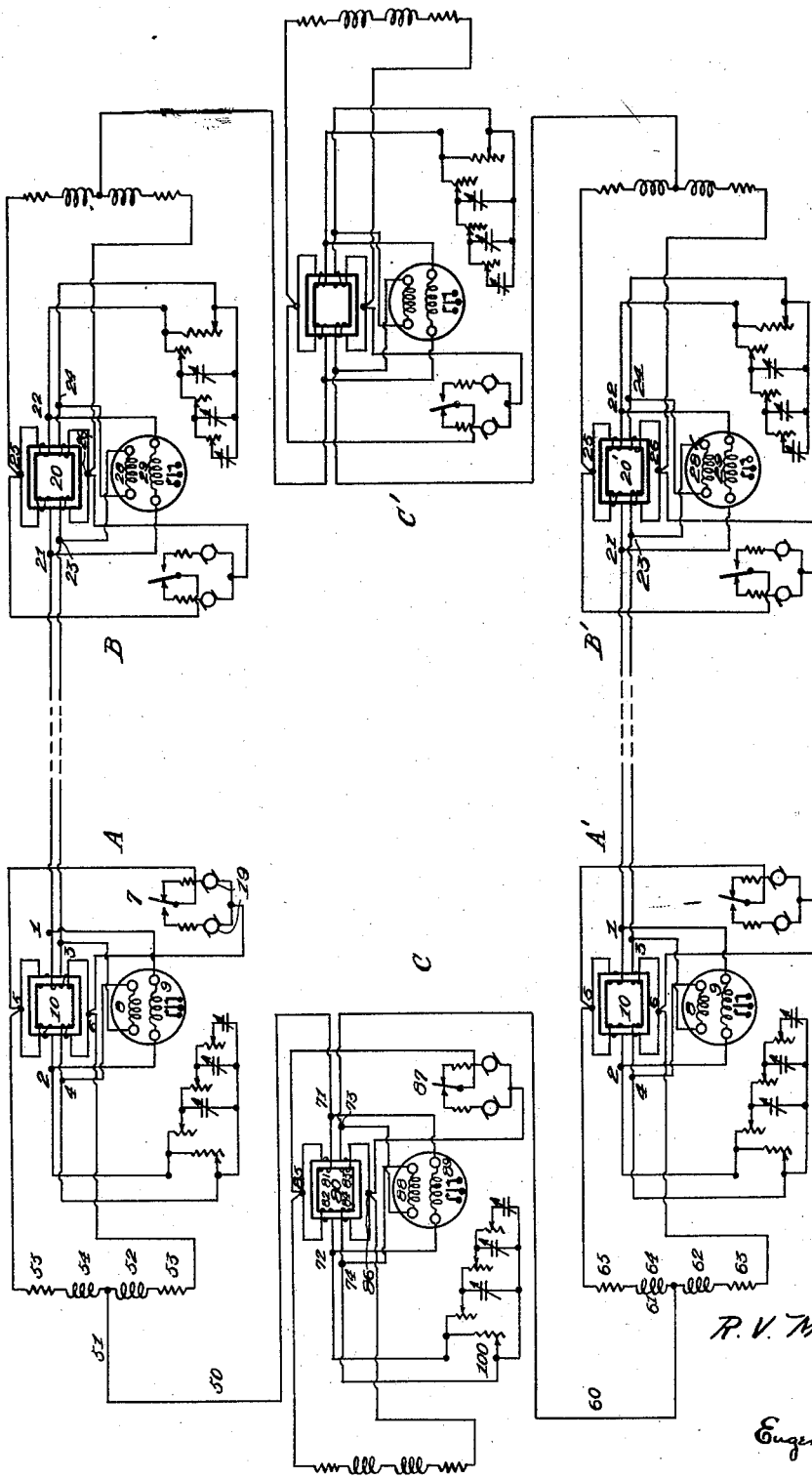

1,788,316

UNITED STATES PATENT OFFICE

RONALD V. MORGENSTERN, OF METUCHEN, NEW JERSEY, ASSIGNOR TO THE WESTERN UNION TELEGRAPH COMPANY, OF NEW YORK, N. Y., A CORPORATION OF NEW YORK

SUPERPOSED TELEGRAPH SYSTEM AND BRIDGE DUPLEX SET FOR USE WITH SUCH SYSTEMS

Application filed September 4, 1929. Serial No. 390,341.

This invention relates to a terminal telegraph set of the bridge duplex type, which may, if desired, form part of a superposed telegraph system.

An object of the invention is to provide means in a bridge duplex set whereby the receiving relay of the set will respond to a movement of the distant transmitting device, but will be unaffected by the operation of the transmitting device located at its home set.

A further object of the invention is to provide a bridge duplex set so designed that it may form part of a superposed metallic telegraph system, and so associated with the system that there shall be no interference between the superposed circuit and the circuit on which it is superposed.

More specifically, the objects of the invention are to provide a novel bridge duplex set by means of a bridge consisting of four coils wound on a common magnetic core.

The purpose of the four coil bridge is to provide conjugate terminals for the transmitter and receiver of the terminal set of which it forms a part.

A further object of the four-coil bridge is to provide a non-inductive path for currents from the transmitter of the terminal set of which it forms a part, and also, when the bridge forms a part of a metallic circuit set of a superposed system, to provide a non-inductive path for currents of the superposed circuit.

A still further object of the four-coil bridge in a superposed system is to provide points at the terminals of the metallic circuit relay which are equipotential with respect to currents from the superposed circuit.

A related object is to offer a highly inductive path to currents from the transmitter of a distant, corresponding terminal set, in order to selectively direct the received currents to the windings of the receiving relay of the set.

The invention is explained in connection with a simple metallic telegraph circuit, and also in connection with a superposed system. The metallic circuit stations at opposite ends of the metallic line conductors are referred to as comprising sets A and B, and sets $A^1$ and $B^1$, while the superposed circuit stations at opposite ends of the system comprise sets C and $C^1$. It is to be understood that the bridge duplex set of this invention may be used at any or all of these stations. It is also to be understood that, though specially adapted for use with superposed metallic telegraph systems, the invention may also be used as an individual terminal telegraph set.

Obviously, the principles of the invention may be applied also to any type of metallic system in which it may be desired to provide duplex operation, and particularly to systems of the superposed type in which interference must be prevented between the metallic circuits and the superposed circuit.

In the circuits illustrated, the receiving apparatus for the metallic circuits and for the superposed circuit comprises a polarized relay having two main windings preferably although not necessarily designed to fit the windings of the bridge. The two coils of the relay may be connected in either of two ways, as shown in Figs. 1a and 1b. For reasons which will appear hereinafter, the arrangement of Fig. 1b is preferred.

Figs. 1a and 1b may be treated as simple metallic telegraph circuits, or else as portions of superposed systems of the type shown in Fig. 2.

The invention will be understood by reference to the following description and the accompanying drawings in which:

Fig. 1a and Fig. 1b show the invention applied to metallic telegraph circuits. In both figures the relay windings are connected in opposite directions to corresponding points on the bridge.

In Fig. 1a one winding of the receiving relay is connected across the terminals of the bridge coils which are connected to line, and the other across the terminals of the bridge coils which are connected to the artificial line.

In Fig. 1b, one relay winding is connected across each pair of coils on the bridge at the points at which these bridge coils are connected to line and artificial line.

Fig. 2 shows the invention applied to a superposed telegraph circuit. As illustrated, the bridge duplex set is used in the terminal sets of both metallic circuits and also in the terminal sets of the superposed circuits. The method of connection of the windings of the receiving relays is that of Fig. 1b.

In Fig. 1a, at set A the bridge 10 consists of a closed iron core on which are arranged four coils, 11, 12, 13 and 14. These are represented as having the same number of turns, and are connected in pairs, 11, 12 and 13, 14. To the end terminals 1 and 2 of the first pair are connected, respectively, a line conductor and a terminal of the artificial line 20; to the end terminals 3 and 4 of the other pair are connected the other line conductor and the other terminal of the artificial line. The common terminals 5 and 6 of the pairs are connected to the transmitting device 7. In the present case, the transmitting device is represented conventionally by the tongue and contacts of a transmitter, the contacts being connected through current limiting resistances to sources of potential 19. The common point of these sources is connected to terminal 5 and the tongue of the transmitter to terminal 6.

The winding 8 of the two-winding receiving relay of set A is connected to terminals 1 and 3 of the bridge, and the winding 9 to terminals 2 and 4; that is, winding 8 is connected across the terminals of the bridge coils which are connected to line, while winding 9 is connected across the terminals of the bridge coils which are connected to the artificial line.

The pairs of coils of the bridge 10 (and of all the other bridge elements shown) are connected so that the two windings in each pair will set up a flux in the core in the same direction when the two ends of the pair are connected to a source of current. This is the situation with respect to incoming currents from a corresponding distant station. No flux will be set up when equal currents are passed in opposite directions through the two coils of the pair. This is the situation when current is applied from the transmitter of the home set. It is also the situation when current is transmitted or received at the terminal set of the superposed circuit by way of the metallic circuit bridge, as will be explained in connection with Fig. 2.

The artificial line illustrated is of the usual type, having one resistance and three capacity branches. Inductance, although not shown, can be added, if necessary, but the exact design of the artificial line is immaterial to the practice of my invention so long as it provides proper balance for duplex operation.

At station B, the line terminals are indicated at 21 and 23, the artificial line terminals at 22 and 24. The bridge is indicated generally by the numeral 30 and the bridge windings by 31, 32, 33 and 34. The common terminal 25 of coils 31 and 32, is connected to the tongue of the transmitting device 27, while the common terminal 26 is connected to the common return of the metallic battery.

The receiving relay of set B comprises two windings 28 and 29, which are connected in the same way as are the windings of the receiving relay of set A. That is, winding 28 is connected across the line conductors at terminals 21 and 23, while winding 29 is connected across the artificial line at terminals 22 and 24. It will be noted that relay windings 28 and 29 are connected in opposite directions to corresponding points on the bridge.

In Fig. 1b, the same reference numerals are used to indicate corresponding parts. The only difference between Fig. 1a and Fig. 1b is in the manner of connecting the windings of the receiving relay. In Fig. 1b, the winding 8 of the receiving relay is connected from line conductor terminal 3 to artificial line terminal 4, and winding 9 is connected from line conductor terminal 1 to artificial line conductor terminal 2. Similarly, at set B, the winding 28 of the receiving relay is connected from line conductor terminal 23 to artificial line conductor terminal 24, and winding 29 is connected from line conductor terminal 21 to artificial line conductor terminal 22.

As in Fig. 1a, the transmitting device 7 of Fig. 1b of set A is connected to common terminals 5 and 6 while the transmitting device 27 of set B is connected to the terminals 25 and 26.

In Fig. 2, the connection of the transmitting devices and receiving relays of the terminal apparatus of the metallic circuits corresponds to that shown in Fig. 1b. That is, in sets A, and A¹ the transmitting devices are connected across the common terminals 5 and 6 and in sets B and B¹ they are connected across terminals 25 and 26. The windings 8 of the receiving relays of sets A and A¹ are connected across the terminals 3 and 4 while the windings 9 of these relays are connected across the terminals 1 and 2. In sets B and B¹, the windings 28 of the receiving relays are connected across the terminays 23 and 24, while the windings 29 are connected across the terminals 21 and 22.

Fig. 2 shows, in addition, means for superimposing a circuit upon the line conductors in accordance with the principles set out in applicant's copending application Serial No. 258,948, filed March 3, 1928, entitled "Superimposed telegraph circuits."

The superimposed circuit is conductively coupled to the electrical center of the source 19 of metallic signaling current by means of a shunt 51 comprising inductive resistance coils 52, 54 and resistances 53, 55 which may be variable. The conductor 50 of the superimposed circuit is connected to the electrical midpoint of the inductive resistance shunt 51. A similar conductor 60 leads to the electrical midpoint of an inductive resistance shunt 61 of a second metallic circuit, the shunt 61 comprising inductive resistances 62, 64 and resistances 63, 65. The conductors 50 and 60 of the superimposed circuit are connected to the terminals 71 and 73 of a bridge 80 comprising four coils 81, 82, 83 and 84.

The conductors 50 and 60 correspond to the line conductors connected to terminals 1 and 3 of station A. An artificial line 100 is connected to terminals 72, 74 of the bridge 80. A receiving relay for the superimposed circuit comprises windings 88 and 89, 88 being connected between terminals 73 and 74, while 89 is connected between terminals 71 and 72. This arrangement of coil windings is the same as that shown in Fig. 1b. The transmitting device 87 of the superimposed circuit terminal set is connected to the common terminals 85 and 86 of the bridge 80.

At the opposite end of the system, the distant station comprises a terminal set C' for the superposed circuit whose elements are similar to those of the terminal set C.

In discussing the operation of the sets of Fig. 1a, it will be assumed to start that the two points at which battery is normally connected to the coils of the bridge of set B are linked together electrically by means of the resistance shown in dotted lines, instead of through the transmitting device and battery. It will then be possible to send signals in one direction only, namely from set A to set B, and the only current in the circuit will be that originating from set A.

If set A is to be operated duplex, it must not respond to the operation of its transmitting device which operates the receiving relay at set B.

If the artificial line of set A is so adjusted that it has an impedance equal to the sending end impedance of the circuit beyond the line terminals of the bridge at set A over the frequency range in which the duplex system operates, working the transmitting device at set A will have no effect on the receiving relay forming a part of set A. This is so because with the artificial line properly adjusted the voltage drop across the points 1 and 2 is the same as across 3 and 4 and points 1 and 2 will bear the same relationship (i. e. positive or negative) to points 3 and 4. Hence equal currents will flow in opposite directions through the two coils of the relay and there will be no magnetic flux tending to move the relay tongue.

At set B the potential drop across points 21 and 23 will be greater than that across points 22 and 24 because there will be relatively little of the line current flow from point 25 to 26 (or vice versa) through the path composed of the two bridge coils 31 and 33 in series with the artificial line for the reason that the impedance of this path is high compared to that through the resistance shown in broken lines.

With a proper adjustment of the artificial line, equal currents flow in opposite directions through each of the bridge coils of a pair. Under these conditions no flux will be set up in the core and hence the inductance will be zero. The bridge will then act as a non-inductive resistance only to outgoing signals.

If now the resistance of set B is replaced by sources of potential connected to the transmitting device, and if set B is balanced, the receiving relay of each set will respond to a movement of the distant transmitting device, but will be unaffected by the operation of the transmitting device located at its home set.

Referring now to Fig. 1b: When the artificial line of a terminal set is properly adjusted, the potential between points 1 and 2 and 3 and 4, due to the battery at the same set, is zero, and hence the receiving relay will not respond to outgoing signals. On signals originating at the distant set, there will be a difference in potential between points 1 and 2 and 3 and 4. If point 1 is positive with respect to point 2, then point 3 will be negative with respect to point 4. Therefore by connecting the relay coils as shown, i. e. in opposite directions to corresponding points on the bridge, the two coils on the relay will aid each other in causing the relay to operate.

The operation of the system of Fig. 2 is as follows:

As in the case of Fig. 1b, signals originating at the transmitter 7 will not affect the receiving relay of the same set because the balanced condition of the bridge prevents any voltage from being applied across terminals 1 and 2 or across terminals 3 and 4. Therefore no current flows through either of the coils 8 and 9 of the receiving relay of the home set.

At the same time the coils of the bridge 10 are so wound that they offer a non-inductive path to the signals from transmitter 7.

The bridge 80 of the terminal set C of the superposed circuit functions in the same way with respect to signals from transmitter 8. That is, by reason of the balanced condition of the bridge, no current flows through the coils 88 and 89 of the receiving relay of set C, and, by reason of the direction of winding of the coils of bridge 80, it offers a non-inductive path to currents from transmitter 87 flowing to conductors 50 and 60, and then over the line conductors of each metallic circuit in parallel.

The superposed currents from the transmitter 87 which are applied to the mid points of the inductive shunt 51 then pass to the line conductors of a metallic circuit via the bridge coils connected in series with the line conductors. By reason of the direction of winding the bridge coils offer non-inductive paths to currents from the superposed circuit. By reason of the balanced condition of the system, the potential between points 1 and 2 caused by the presence of the superposed circuit is the same as that between points 3 and 4 from the same source. Furthermore points 1 and 3 and points 2 and 4 have the same potential relations with respect to each other. There will be therefore no tendency for a relay on the circuit on which the superposing is done to respond to signals transmitted over the superposed circuit.

As disclosed in the copending application referred to above, any tendency for current to flow from transmitter 7 through the shunt 51 is minimized because of the nature of the shunt.

Thus, the transmitter of set A causes no interference with the receiver of set A nor with the receiver of set C, and the transmitter of set C causes no interference with the receiver of set C nor with the receiver of set A.

Similarly, the sets $A^1$ and C do not interfere with each other, nor does set $C^1$ interfere with set B or set $B^1$, nor sets B and $B^1$ with set $C^1$.

It is obvious that if in Fig. 2 the manner of connecting the relay windings of Fig. 1a were used instead of that of Fig. 1b, the same general conditions would hold good. For each bridge it would hold true that there would be no voltage drop from the superposed circuit across the points 1 and 3 because equal currents would flow through from points 5 and 6 to points 1 and 3. Hence there would be no voltage across 1 and 3 tending to cause the relay of set A to operate. Since there is no tendency for the current from the superposed circuit to flow from points 5 and 6 to 2 and 4, there will be no potential across the other relay coil.

I claim:

1. A bridge duplex telegraph set comprising a common closed core of magnetic material, a plurality of pairs of windings on said core arranged to provide a common terminal and end terminals for each pair, transmitting means connected to common terminals of the pairs, and receiving means connected to the end terminals of the pairs.

2. A bridge duplex telegraph set comprising a common core of magnetic material, a plurality of pairs windings on said core connected to provide a common terminal and end terminals for each pair, line conductors connected to corresponding end terminals of the pairs, a balancing artificial line connected to the other end terminals of the pairs, a transmitter connected to the common terminals of the pairs and a two-coil receiving relay connected to the end terminals of the pairs.

3. A bridge duplex telegraph set comprising a common core of magnetic material, a plurality of pairs of windings on said core connected to provide a common terminal and end terminals for each pair, line conductors connected to corresponding end terminals of the pairs, a balancing artificial line connected to the other end terminals of the pairs, a transmitter connected to the common terminals of the pairs and a two-coil receiving relay having one coil connected to the two end terminals of a pair and a second coil connected to the two end terminals of the other pair.

4. A duplex bridge telegraph set adapted for connection as a terminal set for a telegraph line comprising an inductance coil having two pairs of windings and a closed core, the windings being arranged to provide six terminals of which two are common terminals of said pairs, and means for including the line conductors across two of the four individual terminals and an artificial line across the other two individual terminals.

5. A duplex bridge telegraph set comprising a transmitter, a receiver and a four-coil bridge with means for connecting two coils together and to one terminal of the transmitter, means for connecting the other two coils together and to the other terminal of the transmitter, and means for connecting the receiver to all four arms of the bridge.

6. A superposed telegraph system comprising a metallic circuit and means comprising inductances for superposing a circuit thereon, transmitting apparatus for said superposed circuit, and transmitting apparatus for said metallic circuit, said means providing a non-inductive path to currents from each of said transmitting apparatus.

7. A superposed telegraph system comprising a pair of metallic line conductors and a four coil bridge, an artificial line, transmitting means for the metallic circuit, transmitting means for the superposed circuit, means to connect the artificial line to terminals of two of said coils and the metallic line conductors to terminals of the other two coils, and means to connect both transmitting means at the other terminals of said coils.

8. The combination according to claim 7 and receiving apparatus for the metallic circuit comprising relay coils connected to the line and artificial line terminals of said coils.

9. A superposed telegraph system comprising a pair of metallic line conductors and a four coil bridge, an artificial line connected to terminals of two coils of said bridge so as to provide duplex operation over the metallic circuit, and means for superposing a circuit on said line conductors by way of said four-coil bridge.

10. A superposed telegraph system comprising two pairs of metallic line conductors, means for providing duplex operation over each pair of metallic conductors, each of said means comprising a four-coil bridge and means for superposing a telegraph circuit on said pairs of metallic conductors by way of said four-coil bridges.

11. A superposed telegraph system comprising a pair of line conductors forming a metallic circuit, a four-coil bridge, an artificial line and a pair of artificial line conductors leading thereto, a source of transmitting current for said superposed circuit and means for connecting the source to each of the line conductors and artificial line conductors by way of one coil of said bridge, and a receiving relay for the metallic circuit connected between equipotential points on said line and artificial line conductors.

12. A superposed telegraph system comprising a pair of line conductors forming a metallic circuit, a four-coil bridge, an artificial line and a pair of artificial line conductors leading thereto, a source of transmitting current for said superposed circuit and means for connecting the source to each of the line conductors and artificial line conductors by way of one coil of said bridge, and a receiving relay for the metallic circuit comprising two windings each of which is connected across equipotential points on said conductors.

13. A superposed telegraph system comprising a pair of line conductors forming a metallic circuit, a four-coil bridge, an artificial line and a pair of artificial line conductors leading thereto, a source of transmitting current for said superposed circuit and means for connecting the source to each of the line conductors and artificial line conductors by way of one coil of said bridge, and a receiving relay for the metallic circuit comprising two windings each of which is connected between equipotential points on a line conductor and an artificial line conductor.

14. A telegraph circuit comprising a pair of line conductors and an artificial line, a terminal set comprising a transmitter and a receiver having two relay windings, an inductance device comprising a plurality of windings on a common core, and means for connecting said device to the line and artificial line so as to provide terminals for said transmitter and two sets of terminals for the relay windings both of which shall be conjugate with respect to said transmitter terminals.

In testimony whereof I affix my signature.
RONALD V. MORGENSTERN.